(12) United States Patent
Merrett (10) Patent No.: US 12,385,506 B2
(45) Date of Patent: Aug. 12, 2025

(54) WATER JET TRANSFER DEVICE

(71) Applicant: ETT, L.L.C., Dadeville, AL (US)

(72) Inventor: Stanley L. Merrett, Dadeville, AL (US)

(73) Assignee: ETT, L.L.C., Dadeville, AL (US)

( * ) Notice: Subject to any disclaimer, the term of this patent is extended or adjusted under 35 U.S.C. 154(b) by 206 days.

(21) Appl. No.: 18/360,198

(22) Filed: Jul. 27, 2023

(65) Prior Publication Data
US 2025/0035106 A1   Jan. 30, 2025

(51) Int. Cl.
*F04F 5/10* (2006.01)
*F16K 15/14* (2006.01)
*F04B 49/22* (2006.01)

(52) U.S. Cl.
CPC .............. F04F 5/10 (2013.01); F16K 15/148 (2013.01); *F04B 49/22* (2013.01); *Y10T 137/4841* (2015.04)

(58) Field of Classification Search
CPC ......... F04F 5/10; F04F 3/00; Y10T 137/4841; F04B 49/22; F16K 15/148
See application file for complete search history.

(56) References Cited

U.S. PATENT DOCUMENTS

| | | | |
|---|---|---|---|
| 1,292,183 A * | 1/1919 | Weinberg | B60K 15/03 220/900 |
| 5,082,013 A | 1/1992 | Scheib | |
| 5,509,437 A | 4/1996 | Merrett | |
| 5,797,421 A | 8/1998 | Merrett | |
| 6,193,472 B1 * | 2/2001 | Peterson | A61M 1/742 210/252 |
| 6,789,568 B1 * | 9/2004 | Bunnell | F02M 37/0088 137/527 |
| 6,949,198 B2 | 9/2005 | Reber | |
| 7,644,776 B2 | 1/2010 | Holley | |
| 9,593,676 B2 | 3/2017 | Vanconett | |
| 10,219,663 B2 * | 3/2019 | Fox | E03F 7/10 |

(Continued)

FOREIGN PATENT DOCUMENTS

| | | |
|---|---|---|
| DE | 102017106889 A1 * | 10/2018 |
| GB | 2022707 A * | 12/1979 ............. B63B 13/00 |

OTHER PUBLICATIONS

Translation of DE 102017106889 (Year: 2018).*

(Continued)

*Primary Examiner* — Umashankar Venkatesan
(74) *Attorney, Agent, or Firm* — Neustel Law Offices (57) ABSTRACT

A water jet transfer device includes a jet transfer assembly, an intake assembly and an output barrel. The jet transfer assembly includes a body having a water-outlet end coupled to a first section of flexible tubing and a water-intake end coupled to a second section of flexible tubing. The jet transfer assembly also includes a jet tube that establishes a negative demand pressure within the body and a check valve assembly having a valve support plate and a flexible valve seal member secured to the valve support plate. The second section of flexible tubing is coupled to an intake assembly positioned in a water holding tank containing water. The first section of flexible tubing is coupled to an output barrel through which water drawn through the intake assembly and into the body responsive to the negative demand pressure is delivered to another water holding tank.

27 Claims, 10 Drawing Sheets

(56) References Cited

U.S. PATENT DOCUMENTS

| 10,729,995 | B2 | 8/2020 | Reber | |
| 11,073,139 | B2 * | 7/2021 | Anteau | F04F 5/10 |
| 11,248,611 | B2 | 2/2022 | Hashizume | |
| 2003/0116192 | A1 * | 6/2003 | Svendsen | F02M 37/0023 137/265 |
| 2004/0244996 | A1 | 12/2004 | Kravkov | |

OTHER PUBLICATIONS https://kochek.com/wp-content/uploads/2017/10/holley-transfer-pipe.pdf; Kochek Holley Transfer Pipe Online Brochure; Received Feb. 22, 2023.

https://kochek.com/shop/low-level-threaded/; Kochek "Low Level Strainer—Threaded—Female" Product Webpage; Received Feb. 22, 2023.

https://www.fol-da-tank.com/product/low-flow-strainer/; Fol-da-Tank "Aluminum Low-Flow Strainer" Product Webpage; Received Feb. 22, 2023.

https://www.ziamatic.com/product/suction-less-coupling/; Zico Ziamatic Corp "Suction Strainer—Less Coupling" Product Webpage; Received Feb. 22, 2023.

https://tft.com/product/a03sp-jetfif; Task Force Tips "Low-Level Strainer 4.0" Storz Product Webpage; Feb. 22, 2023.

\* cited by examiner

WATER JET TRANSFER DEVICE

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

The described example embodiments in general relate to water jet transfer device for transferring water from one holding tank to another holding tank.

In order to establish a sufficient water supply required for fighting fires in rural areas, which are located away from a pressurized water source such as a city water system, it is often necessary for the fire department to transport water to the scene of a fire using large tanker trucks. The water from the tanker trucks is then dumped into one or more portable holding tanks located at the fire scene. The water within the one or more portable holding tanks can then be used by a fire engine equipped with a pump. The water from the one or more portable holding tanks enters the fire engine pump via a rigid suction hose having an intake strainer attached to the end of the those. These strainers, termed low level strainers in the fire industry, provide flow to meet the fire engine pumping capacity, which is typically 1250-1500 GPM (gallons per minute).

Hauling water using tankers is known as a water shuttle. The water shuttle process entails filling of the tankers at a loading site and emptying the tankers into holding tanks at the fire scene. It is customary in the instance of large fires to deploy multiple portable holding tanks. While multiple tanks allow large quantities of water to be stored on site, the water must be transferred to the suction holding tank (e.g., the portable tank from which the fire engine pump draws water). To accomplish this transfer, a six-inch diameter rigid suction hose coupled to a low-level strainer is typically used to transfer water from portable tank to portable tank to the suction holding tank. However, the six-inch suction hose is limited to 600-750 GPM, which is far less than the 1250-1500 GPM needed to meet pump requirements. Hence, the fire engine pump cannot maintain full capacity as the water is not being transferred from one tank to another at a sufficient speed to support full capacity. With an insufficient amount of water, the fire engine pump loses suction (e.g., cavitates) and quits working. To resolve this issue, the current common practice is to simultaneously utilize at least two suction hoses, and respective low-level strainers coupled thereto, to transfer water from one portable tank to another providing a water transfer rate of 1200-1500 GPM.

SUMMARY

Some of the various embodiments of the present disclosure relate to a water jet transfer device that can singularly transfer water between first and second portable holding tanks at a rate sufficient to meet the pumping capability (e.g., 1250-1500 GPM) of a fire engine pump vehicle. In certain embodiments, the water jet transfer device includes a jet transfer assembly, an intake assembly and an output barrel. The jet transfer assembly includes a body having a water-outlet end coupled to a first section of flexible tubing and a water-intake end coupled to a second section of flexible tubing. The jet transfer assembly also includes a jet tube that establishes a negative demand pressure within the body and a check valve assembly having a valve support plate and a flexible valve seal member secured to the valve support plate. The second section of flexible tubing is coupled to an intake assembly positioned in a water holding tank containing water. The first section of flexible tubing is coupled to an output barrel through which water drawn through the intake assembly and into the body responsive to the negative demand pressure is delivered to another water holding tank. In certain embodiments, the jet transfer assembly itself is coupled between the drain sleeve of a first water holding tank and the drain sleeve of a second water holding tank wherein the negative demand pressure created by the jet tube causes water to be drawn from the first water holding tank through the first drain sleeve and through the body of the jet transfer assembly to be output to the second water holding tank via the second drain sleeve.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Some of the various embodiments of the present disclosure relate to a singular water jet transfer device 10 that can transfer water from one portable holding tank to another portable holding tank at a rate of 1250-1500 GPM. The functionality of the water jet transfer device 10 is particularly suited to a fire scene where a local source of pressurized water is unavailable and water for putting out the fire must be shuttled to the location of the fire scene. Other applications for which the functionality of the water transfer device are suitable are also possible.

The water jet transfer device 10 of the present disclosure generally includes a jet transfer assembly 20, a water-intake assembly 70, and an output barrel 100. The jet transfer assembly 20 includes a body 22 having a water-outlet end 24 coupled to a first section of flexible tubing 32 and a water-intake end 26 coupled to a second section of flexible tubing 34. The body 22 additionally includes therein a jet tube 44 that establishes a negative demand pressure within the body 22 and a check valve assembly 50 proximate the water-intake end 26. The check-valve assembly 50 includes a valve support plate 52 and a flexible valve seal member 64 secured to the valve support plate 52. The valve support plate 52 includes a plurality openings 56 and the flexible valve seal member 64 flexes to expose at least a portion of the plurality of openings 56 of the valve support plate to enable an in-flow of water into the body at the water-intake end responsive to negative demand pressure established by the jet tube 44 and flexes to cover at least a portion of the plurality of openings 56 to prevent an out-flow of water from the body 22 at the water-intake end 26. The water-intake assembly 70 is coupled to the second section of flexible tubing 34 and serves to draw water from a holding tank 120 into the body 22 responsive to the negative demand pressure. The output barrel 100 is coupled to the first section of flexible tubing 32 and delivers water expelled from the body 22 to a second holding tank 120.

In certain embodiments, the inner diameter of the body 22 is at least 8 inches while the inner diameter of the jet tube 44 is at least 0.8 inches. Further, the jet tube 44 is preferably of a curved, one-piece configuration. The flexible valve seal member 64 is secured to the valve support plate 52, via a hinge bar 66 secured between the flexible valve seal member 64 and a mounting rib 58 of the valve support plate 52. The hinge bar 66 serves the divide the flexible valve seal member 64 into first and second symmetrical flaps 64a. 64b. The valve support plate 52 is at least eight inches in diameter.

In certain embodiments, the water intake assembly 70 includes a lower portion 75 defined by an upper plate 74 coupled to a lower plate 72 and an upper portion 71 that includes an intake pipe 76 secured to the upper plate 74. The lower plate includes a plurality of section openings 78 to help secure the water intake assembly 70 to a floor 140 of a portable holding tank. The lower plate 72 preferably includes upwardly bent vortices-reducing first and second ends 80a, 80b. The lower portion 75 of the water intake assembly is defined by four sides with each side having a 3 water-drawing opening. A space between the upper plate 74 and the lower plate 72 includes a plurality of vortices-reducing dividers 84 that can divide the lower portion 75 into a plurality of zones, e.g., six zones. The intake pipe 76 is oriented at approximately 30 degrees relative to the upper plate 74.

In certain embodiments, the output barrel 100 includes an elongate neck portion 102 and an output head portion 104. Further, a diffuser plate 106 is preferably included within the elongate neck portion 102. An exterior of the output barrel 100 includes a handle 103, one or more strap holders 112a, 112b through which a safety strap 116 can be threaded to secure the output barrel 100 to an upper railing 118 of a portable holding tank 120, and one or more u-shaped mounting brackets 114a, 114b that are mountable atop the upper railing 118 of the portable holding tank 120 to position the output barrel 100 at an angle of approximately 30 degrees relative to the upper railing 118. The u-shaped mounting brackets 114a, 114b, may be rotatably secured to the output head portion 104 of the output barrel 100.

In certain embodiments, one or more quick locking lever clamps 40 are used to secured the second section of flexible tubing 34 to the water-intake assembly 70 and to secure the first section of flexible tubing 32 to the output barrel 100 for quick assembly and disassembly.

In certain embodiments, the water-intake assembly 70 and the output barrel 100 are removed from the jet transfer assembly 20 enabling the jet transfer assembly 20 to be positioned intermediate a first drain sleeve 142 of a first water holding tank 120 containing water and a second drain sleeve 144 of a second water holding tank with the second section of flexible tubing 34 coupled to the first drain sleeve and the first second of flexible tubing coupled to the first section of flexible tubing 32. In this configuration, a negative demand pressure created by the jet tube 44 within the body 22 of the jet transfer assemble causes water to be drawn from the first water holding tank 120 through the first drain sleeve 142 and into the body 22 of the jet transfer assembly 20 and expelled through the second drain sleeve 144 and into the second water holding tank 120.

B. Jet Transfer Assembly

Figures 1, 2:
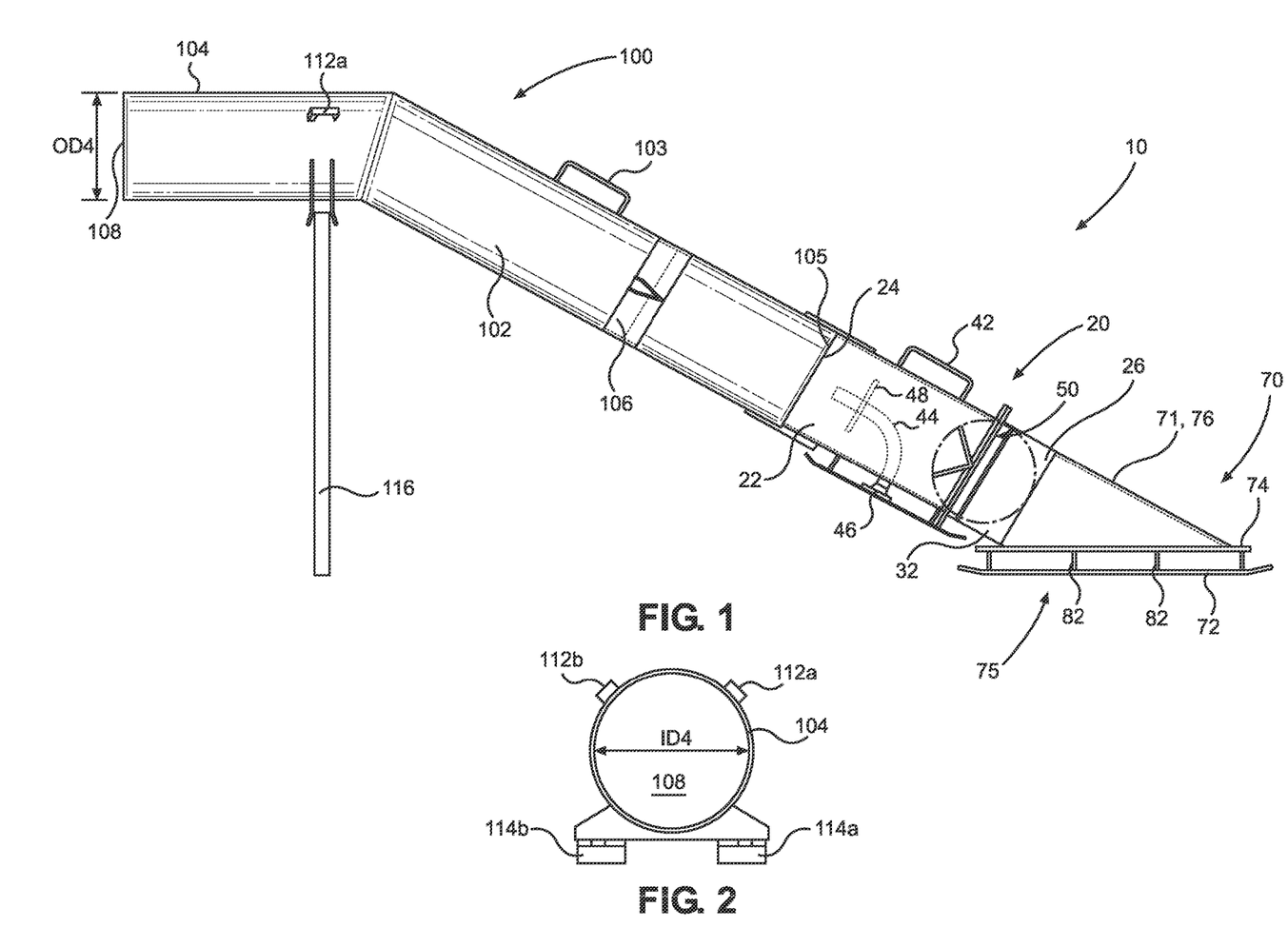
FIG. 1 is a side view of a water jet transfer device in accordance with an example embodiment.
FIG. 2 is a front view of an example embodiment of an output barrel of the water jet transfer device.
Figure 3:
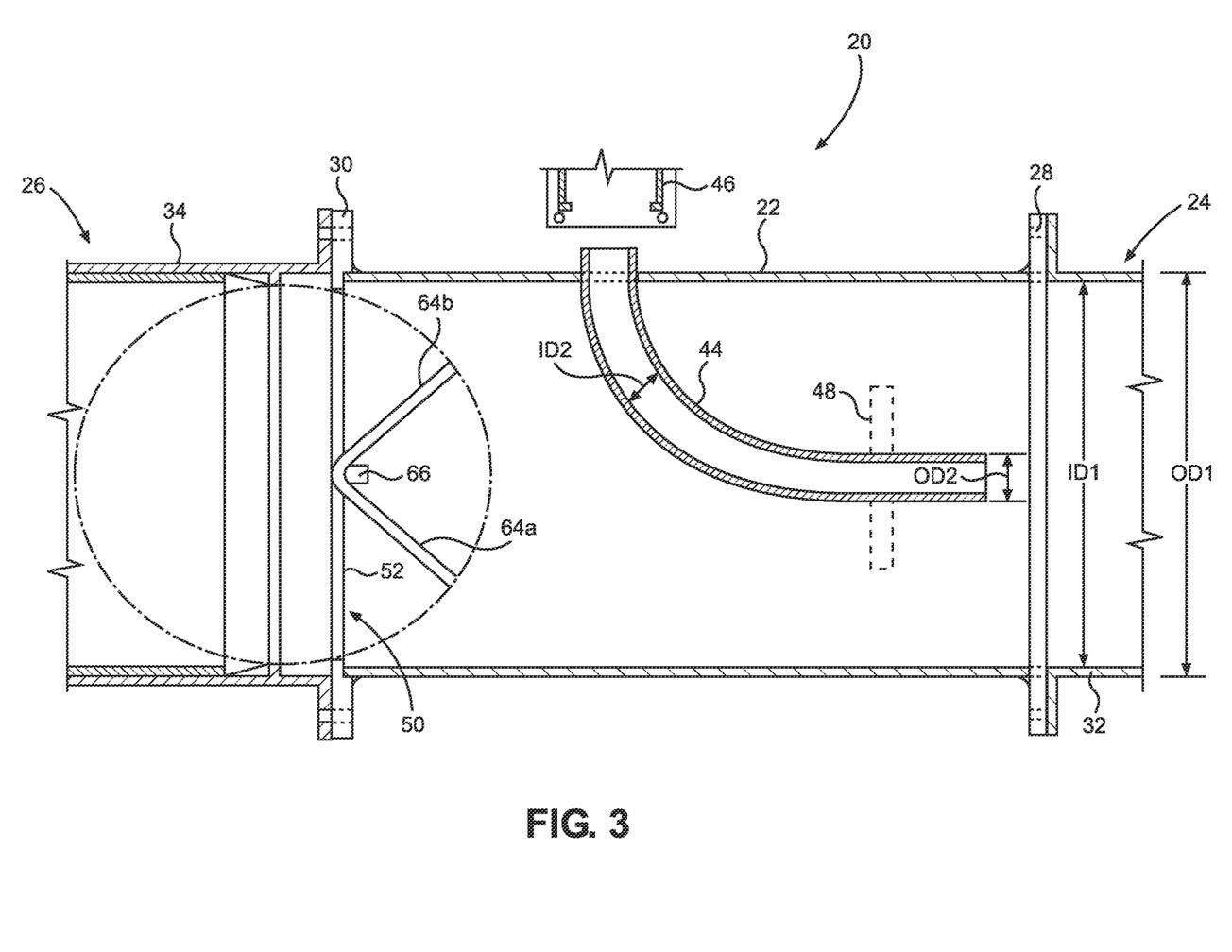
FIG. 3 is a top view of an example embodiment of a jet transfer assembly of the water jet 27 transfer device.

A jet transfer assembly 20 of the water jet transfer device 10, best seen in FIGS. 1-3, includes a body 22 of a circular configuration having an outlet end 24 and an intake end 26. The body 22 is preferably of a rigid material including a first flange 28 at the outlet end 24 of the body 22 and a second flange 30 at the intake end 26 of the body 22. A first section 32 of flexible tubing (e.g., neoprene rubber or other appropriate material) is secured to the first flange 28 and a second section of flexible tubing 34 is secured to the second flange 30. The flexibility of the first section 9 and the second section 34 of flexible tubing enable the jet transfer assembly 20 to be secured to the intake assembly 70 and output barrel 100 through use of one or more quick locking lever clamps 40 at the intake end 26 and the outlet end 24. A handle 42, positioned 90 degrees opposite a jet tube 44, is secured to the body 22 enables easy lifting of the jet transfer assembly 20. In certain embodiments, an outer diameter (OD1) of the body 22 is approximately 8.625 inches while an interior diameter (ID1) of the body is approximately 8.3 inches.

The jet transfer assembly 20 additionally includes a jet tube 44 that extends through the body 22 and is equipped with a hose fixture 44 to interface with a priming hose 138 (see FIGS. 8 and 10) of a fire engine pumping vehicle 136. A support bracket 46 secured to an interior surface the body 20 supports the jet tube 44 in a suspended configuration. In certain embodiments, the jet tube 44 is of a unitary configuration (e.g., one piece) having an outer diameter (OD2) of approximately 1.1 inches and an interior diameter (ID2) of approximately 0.8 inches.

Figure 4:
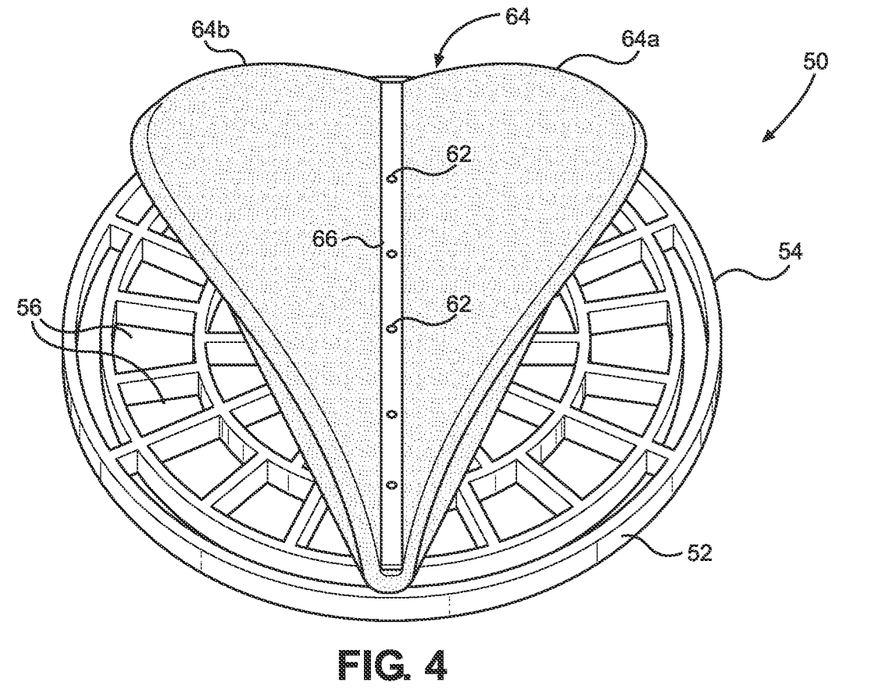
FIG. 4 is a perspective view of an example embodiment of a check valve assembly of the water jet transfer device.
Figure 5:
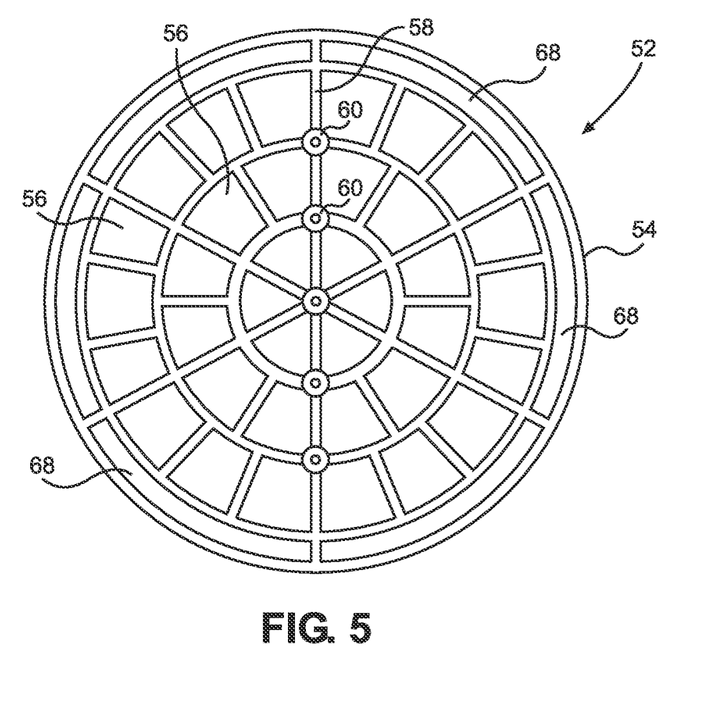
FIG. 5 is a top view of the check valve assembly.

The jet transfer assembly 20 further includes a check valve assembly 50, which is best seen in FIGS. 3-5. The check valve assembly 50 functions to hold water in the jet tube 44 during periods of transition and aids in priming. Further, the check valve assembly 50 provides an instant flow start-up and eliminates that friction loss associated with spring-loaded check valves that are used prior art designs. The check valve assembly 50 includes a circular valve support plate 52 having a periphery 54 bonded or otherwise secured to an inner surface of the second section of flexible tubing 34 and/or the interior surface 48 of the body 22 at the intake end 26 in an orientation that is substantially perpendicular to the intake flow to the body 22. The support plate 52 is formed with a plurality of openings 56 arranged in concentric arrays which are designed to be large enough to admit a free flow of water into the body 22 when negative demand pressure generated by the jet tube 44 is established.

The support plate 52 of the check valve assembly 50 further includes a valve seal mounting rib 58 extending along a diameter of the support plate 52. The valve seal mounting rib 58 is formed with a plurality of radially spaced bores 60 which respectively receive a series of screws 62 used to secure a flexible valve seal member 64 (of neoprene rubber or other appropriate material) of the check valve assembly 50 with a hinge bar 66 to one side of the support plate 52 enabling the flexible valve seal member 64 to flex into the interior of the body 22, e.g., an open position, when receiving flow through the intake end 26 of the body 22. The flexible valve seal member 64 is also of a circular configuration and has a diameter adapted to cover the concentric arrays of openings 56 in the support plate 52 when the check valve assembly 50 is in a closed position due to the absence of flow at the intake end 26 and/or when, during the initial filling of the body 22, the pressure of the water entering the body 22 from the jet tube 44 pushes against the flexible valve seal member 64. In this manner, the self-closing action of the flexible valve seal member 64 against the support plate 52 serves to retain the water within the body 22 for fast and reliable filling 17 of the body 22.

However, the support plate 52 additionally includes a series of elongate circumferentially spaced outer openings 68 (each subtending an arcuate interval of approximately 60 degrees), which are radially outwardly spaced from the periphery of the flexible valve seal member 64 when in the flat closed position. These outer openings 68 in the support plate 52 function as weep holes which serve to automatically drain the body 22 upon completion of pumping with the water jet transfer device 10. The outer openings 68 are designed to result in a controlled leakage of the check valve assembly 50 without seriously affecting the ability of the valve to retain water within the body 22 for a sufficient time period to allow for rapid filling of the body 22 when needed.

The hinge bar 66 divides the flexible valve seal member 64 into first and second symmetrical valve flaps 64a, 64b with each opening and closing about the axis defined by the hinge bar 66 in response to positive filling pressure (closing the check valve assembly 50) or negative demand pressures (automatically opening the valve).

C. Intake Assembly

Figure 6:
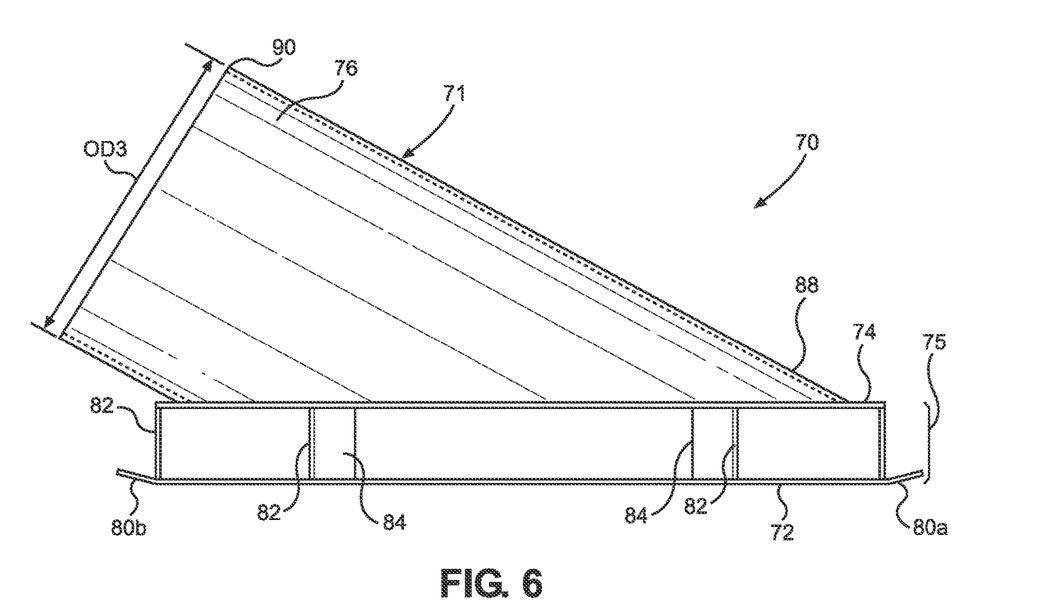
FIG. 6 is a side view of an example embodiment of an intake assembly of the water jet transfer device.
Figure 7:
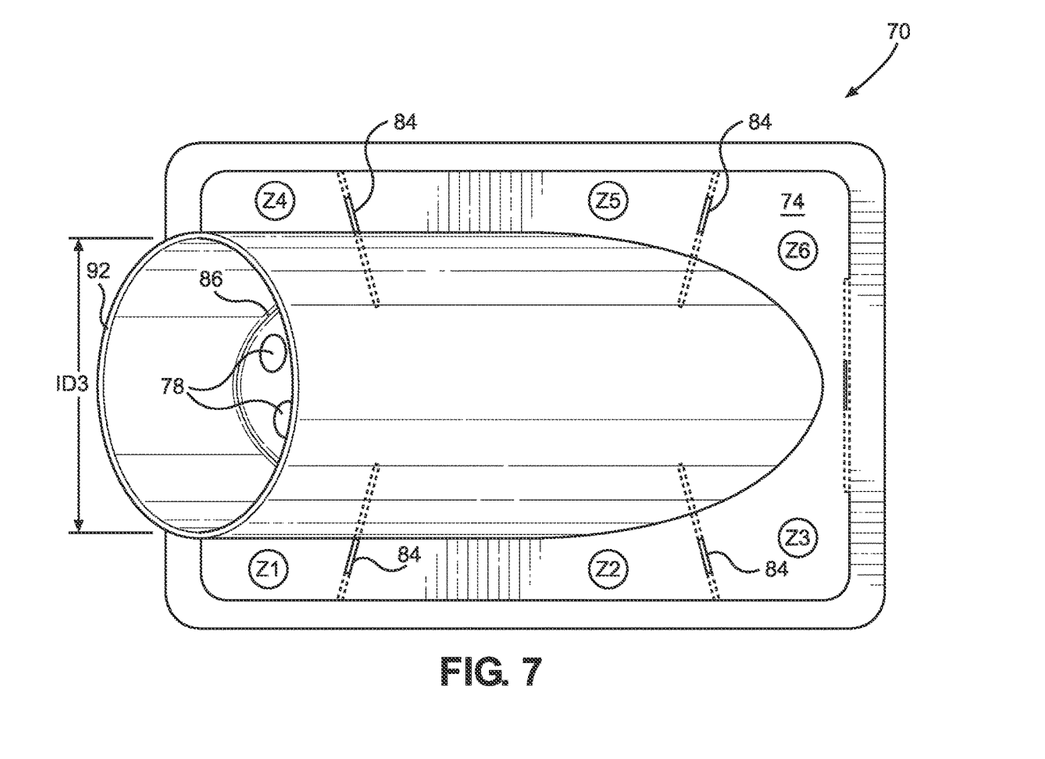
FIG. 7 is a top view of the intake assembly.
Figure 8:
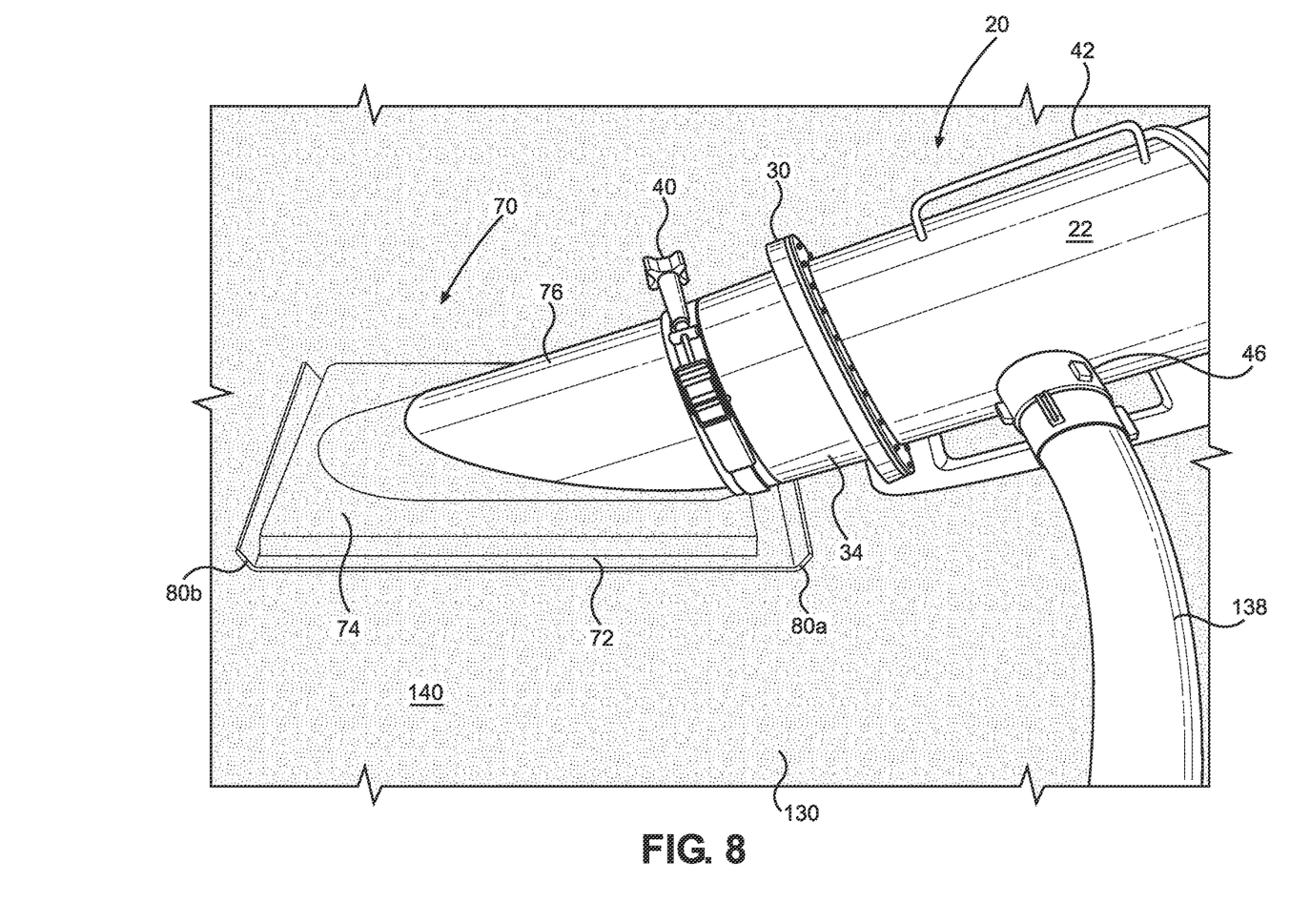
FIG. 8 is perspective view of the water jet transfer device within a portable holding tank.

The intake assembly 70 (a.k.a. strainer), best seen in FIGS. 6-8, generally comprises a lower portion 71 having a substantially rectangular lower plate 72 and a substantially rectangular upper plate 74, and an upper portion 75 comprising an intake pipe 76; each of the plates 72,74 and intake pipe 76 are of rigid material that enables welding of the components. The lower plate 72 is preferably provided with a plurality of circular openings 78 to help establish suction with the floor of an underlying liner of a portable holding tank to help prevent movement of the intake assembly 70 within the portable holding tank and to help prevent the intake assembly 70 from being dislodged when arriving trucks dump their load of water into the portable holding tank. In certain embodiments, the lower plate 72 includes thirteen circular openings 78 that are one inch in diameter with three rows of three circular openings 78 positioned centrally on the lower plate 72 and one circular opening 78 in each of the four corners of the lower plate 72. The lower plate 72 preferably includes a first end 80a and a second end 80b that extend beyond a length of the upper plate 74 and are bent upward to help eliminate vortices during water intake.

The upper plate 74, which is approximately the same length and width of the lower plate 72, excepting the first and second ends 80a, 80b of the lower plate 72, is separated from the lower plate 72 by a plurality of spacers 82 that are positioned between and secured (e.g., welded) to the upper plate 74 and the lower plate 72 proximate the corner, outer edges of the upper plate 74 and lower plate 72; the spacers 82 serve to securely couple the plates while also allowing intake between the upper plate 74 and lower plate 72 on all four sides of the rectangular configuration. A plurality of zone dividers 84 are also positioned intermediate the upper plate 74 and lower plate 72. In the illustrated embodiment, the four zone dividers 84 divide the space between the upper plate 74 and lower plate 72 into six zones (Z1-Z6). The zones (Z1-Z6) function to more evenly spread the water intake to help prevent vortices. The upper plate 74 additionally includes an opening 86 to accommodate a lower end 88 of the intake pipe 76.

The lower end 88 of the intake pipe 76 is centrally positioned atop the upper plate 74 and over the opening 86 in the upper plate 74 at an angle of 30 degrees relative to the upper plate 74. The intake pipe 76 is configured to present an upper end 90 having a circular outflow opening 92 that is received within the second section of flexible tubing 34 of the jet transfer assembly 20. The second section of flexible tubing 34 of the jet transfer assembly 20 is secured to and substantially scaled about the upper end 90 of the intake pipe 76 with one or more quick locking lever clamps 40 (see FIG. 8) enabling water flow from the intake assembly 70 to the jet transfer assembly 20 upon a negative demand pressure being established in the jet transfer assembly 20. In certain embodiments, the outflow opening 92 has an outer diameter (OD3) of approximately 8.6 inches 9 and an inner diameter (ID3) of approximately 8.3 inches.

D. Output Barrel

The output barrel 100, best seen in FIG. 1, generally includes an elongate neck portion 102 and output head portion 104, each of a circular configuration. In certain embodiments, the output barrel 100 is provided with an outer diameter (OD4) of approximately 8.6 inches and an inner diameter (ID4) of approximately 8.3 inches. Further, in certain embodiments, the output barrel 100 is of a unitary configuration with all portions of the output barrel 100 being made of a lightweight aluminum tubing.

Figure 12:
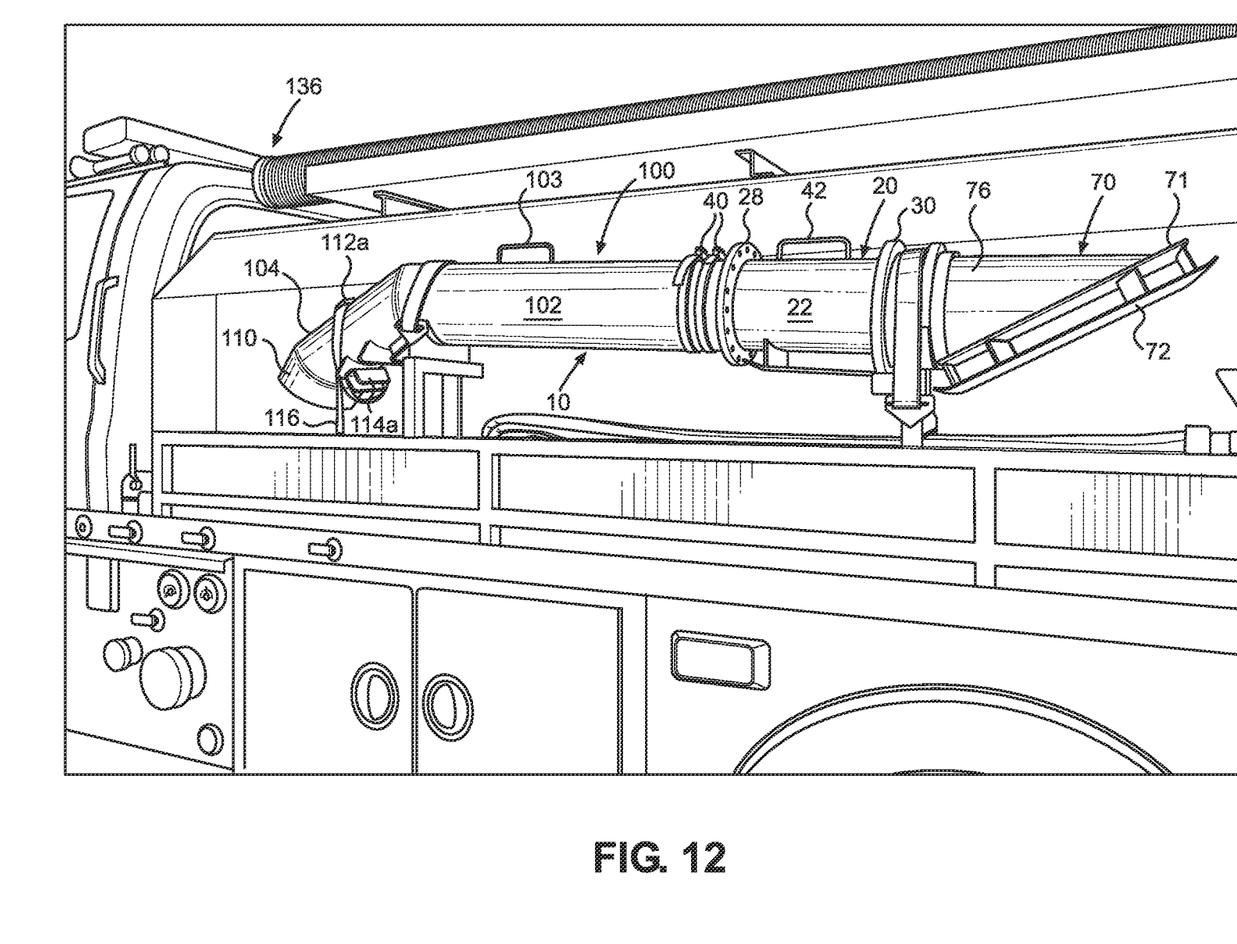
FIG. 12 is a perspective view of the water jet transfer device mounted on a vehicle for transport.

The elongate neck portion 102 of the output barrel 100 includes a lower end 105 that is configured to be received within the first section 32 of flexible tubing of the jet transfer assembly 20. The first section 32 of flexible tubing is secured to and substantially sealed about the lower end 105 of the neck portion 102 with one or more quick locking lever clamps 40 (see FIG. 12) enabling water flow from the jet transfer assembly 20 to the output barrel 100. A diffuser plate is provided within the interior of the elongate neck portion 102 at approximately mid-length of the elongate neck portion 102 in an orientation that is perpendicular to the water flow. The diffuser plate 106 provides additional suction to that created by the jet tube 44 enabling the water to be both pulled through the jet transfer assembly 20 and pushed through the output barrel 100. The elongate neck portion 102 additionally includes a handle 103 for easy lifting of the output barrel 100 itself or, when used in conjunction with the handle 42 of the jet transfer assembly 20, the combined handles 103 and 42 enable the lifting of an assembled water jet transfer device 10 including the output barrel 100, jet transfer assembly 20, and intake assembly 70. A fully assembled water jet transfer device 10 can be secured (e.g., secured with belts or clamps) to a vehicle for transportation to different locations, see FIG. 12, or easily broken down into its component parts for transportation and reassembly in a desired configuration.

The elongate neck portion 102 transitions to the output head portion 104 to present the output head portion 104 in a horizontal orientation that is substantially parallel to the ground. In certain embodiments, the output head portion 104 terminates at an opening 108 defined by a plane that is perpendicular to the ground as shown in FIG. 1 while in other embodiments the output head portion 104 terminates with a downward angled spout portion 110 to direct outflowing water to a nearby portable holding tank as shown, for example, in FIGS. 10-12.

Figure 11:
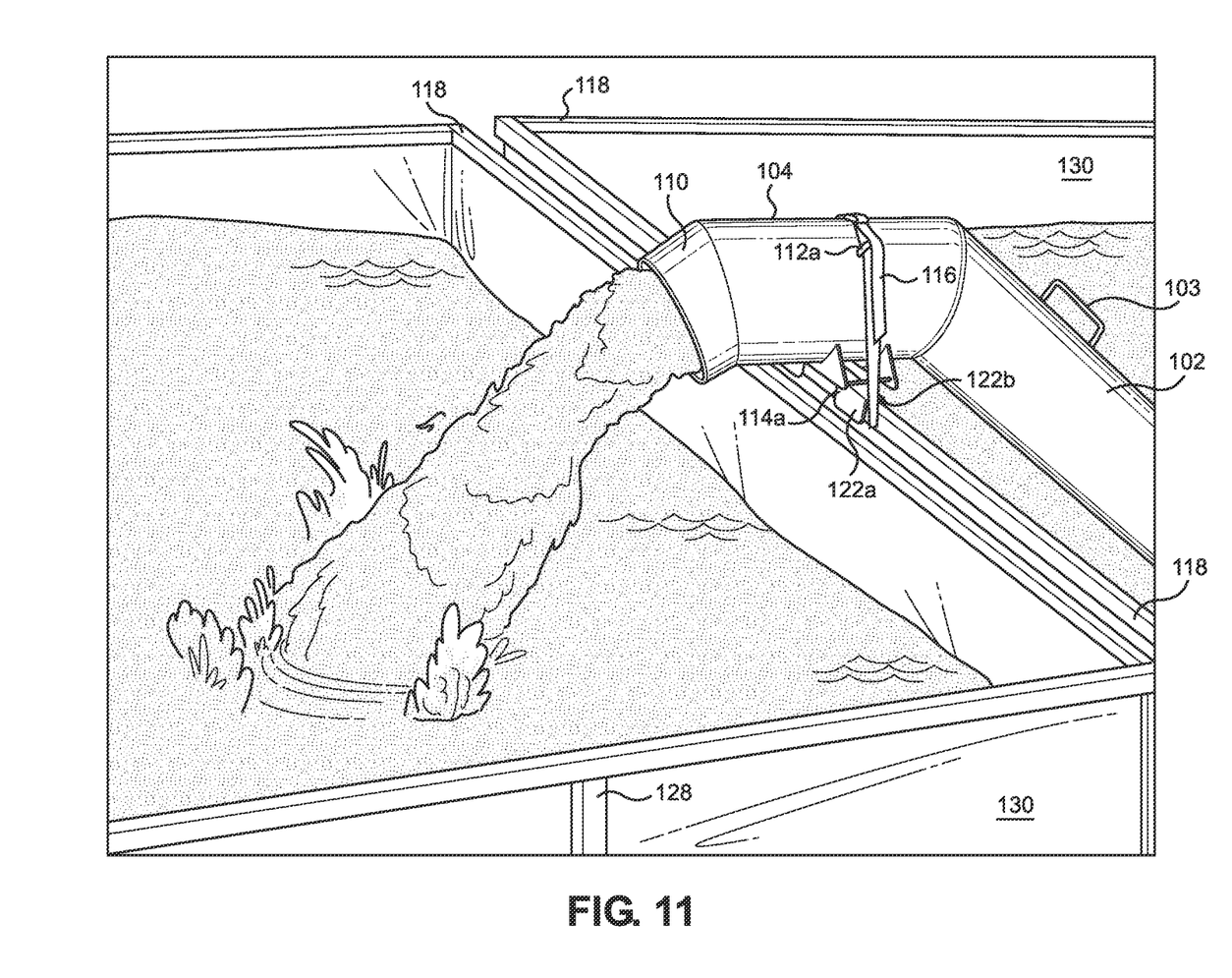
FIG. 11 is a perspective view of the water jet transfer device transferring water from a first portable holding tank to a second portable holding tank.

The output head portion 104 is additionally equipped with one or more strap holders 112 as well as one or more u-shaped mounting brackets 114, both of which are best seen in FIGS. 2 and 11. In the illustrated embodiment, two strap holders 112a, 112b (e.g., rigid outward extending loops) are upwardly positioned at ±45 degrees relative to a central axis of the output head portion 104 and are additionally positioned slightly rearward of the midpoint of the length of the output head portion 104. The strap holders 112a, 112b provide an opening capable of receiving a safety strap 116. The safety strap 116 is provided to help secure the position of the output barrel 100 and help prevent its movement in response to the powerful water flow. The safety strap 116 can be wrapped about an upper railing 118 of a frame of a portable holding tank 120, to one or both sides of the output head portion 104, and threaded through the strap holders 112a, 112b whereby the safety strap 116 can be secured tightly against the output head portion 104.

In the illustrated embodiment, two u-shaped mounting brackets 114a, 114b are rotatably secured to the output head portion 104. The u-shaped mounting brackets 114a, 114b are downwardly positioned at ±45 relative to the central axis of the output head portion 104 and are additionally positioned slightly rearward of the midpoint of the length of the output head portion 104 below the respective strap holders 112a, 112b. The u-shaped mounting brackets 114a, 114b are rotatable to a position wherein the open end of the u-shaped mounting brackets 114a, 114b receives the upper railing 118 of the portable holding tank 120 positioning arms 122a, 122b to either side of the upper railing 118, which enables the output barrel 100 to be installed on the frame of the portable holding tank 120 at an angle of +30 degrees relative to the upper railing 118.

E. Operation of Preferred Embodiment

Figure 9:
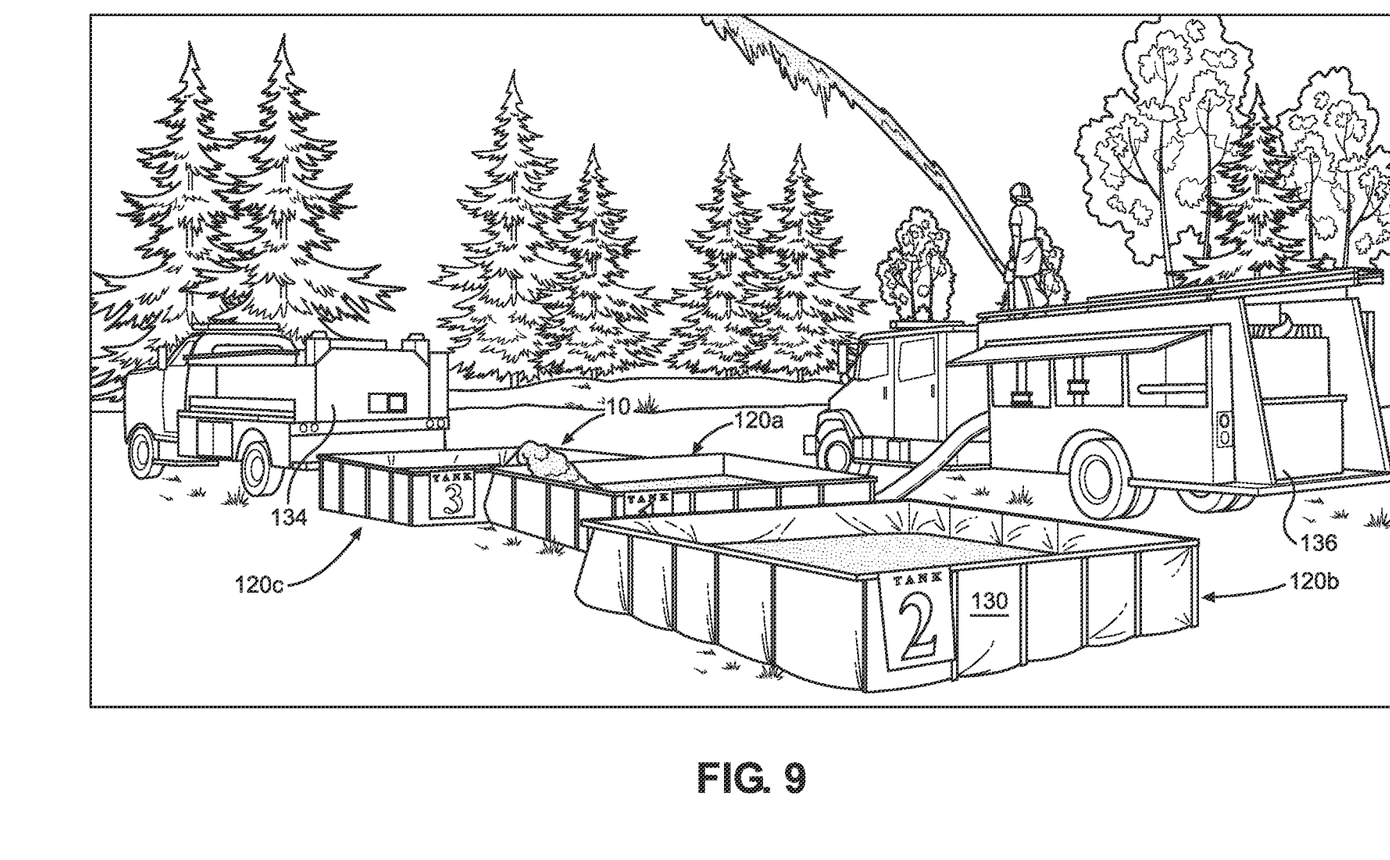
FIG. 9 is a view an example configuration of a plurality of portable holding tanks in which the water jet transfer device is used.
Figure 10:
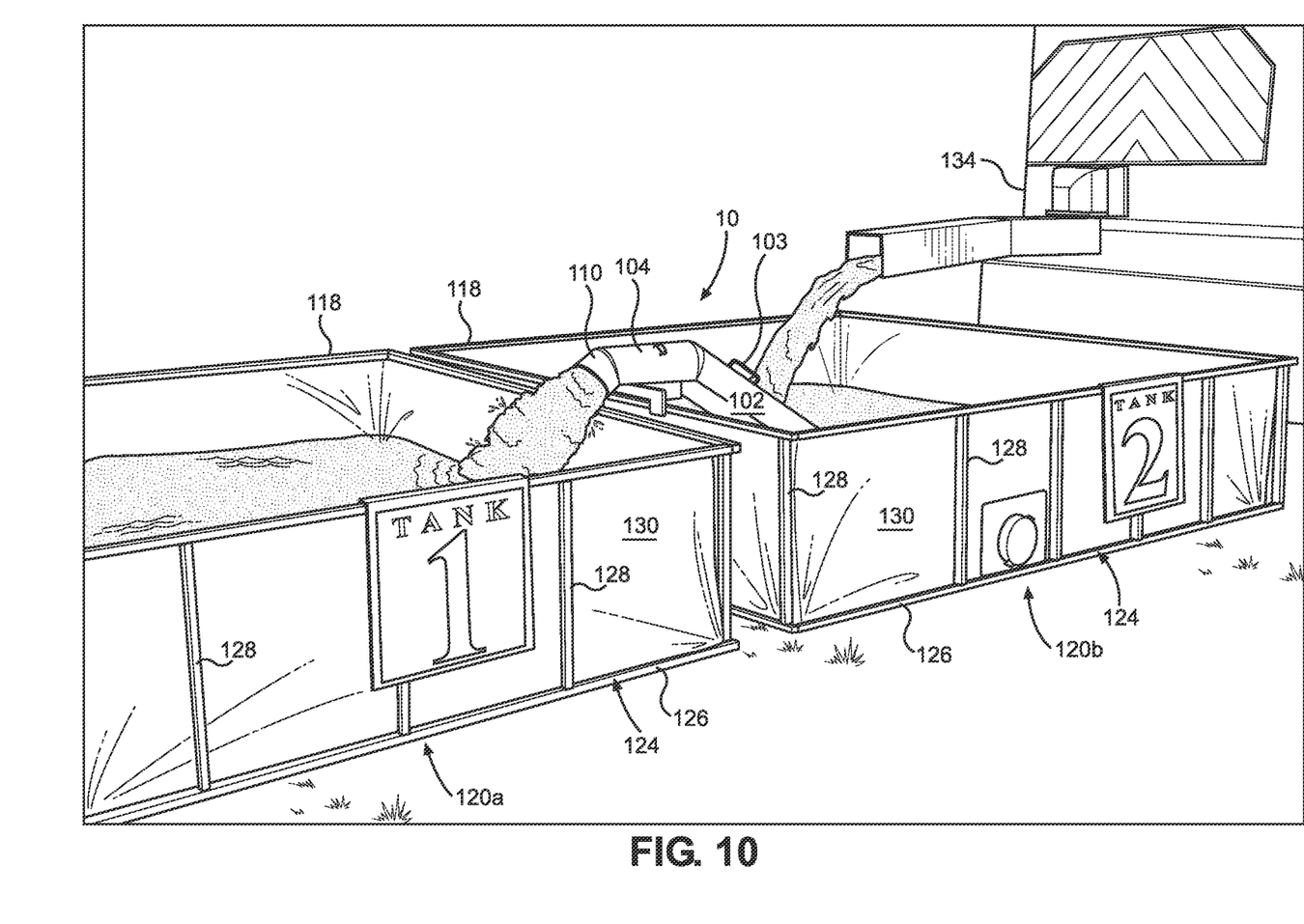
FIG. 10 is a perspective view of the water jet transfer device transferring water from a first portable holding tank to a second portable holding tank.

An example environment in which the water jet transfer device 10 is used is illustrated in FIGS. 8-11. As shown the environment includes two or more portable holding tanks 120, such as a first portable holding tank 120a, a second portable holding tank 120b, and a third portable holding tank 120c. Each of the portable holding tanks 120 typically includes an expandable/collapsible frame 124 defined by upper railings 118 and lower railings 126 that define a periphery of the portable holding tank 120; the upper railings 118 and lower railings 126 are coupled together by a plurality of vertical supports 128. A plasticized fabric tarp 130 is suspended from the upper railings 118 with rope/cording or other suitable means to form the tank itself. The example environment additionally includes one or more tanker vehicles 134 and one or more fire engine pump vehicles 136. The tanker vehicles function as water shuttles to transport water to the site of a fire wherein the tanker vehicle 134 empties its tank into portable holding tank 120b, as shown in FIG. 10. The one or more fire engine pump vehicles 136 provide a priming hose 138 that is fluidly coupled to the hose fixture 46 of the jet transfer assembly 20.

If water jet transfer device 10 is not already assembled, assembly can quickly be performed by securing the first section of flexible tubing 32 at the outlet end 24 of the jet transfer assembly 20 to the neck portion 102 of the output barrel 100 with one or more quick locking lever clamps 40 and by securing the second section of flexible tubing 34 of the jet transfer assembly 20 to the upper end 90 of the intake pipe 76 of the intake assembly 70 with an additional one or more quick locking lever clamps 40.

The intake assembly 70 of the assembled water jet transfer device 10 can then be placed on the floor 140 of the portable holding tank 120b (see FIG. 8), u-shaped brackets 114 of the output head portion 104 are positioned atop the upper railing 118 of the portable holding tank 120b, and the safety strap is wrapped about the upper railing 118 of the portable holding tank 120b, through the strap holders 112, and tightened to the water jet transfer device 10. With water covering the intake assembly 70, the fire engine pump vehicle 136 can pump water through the priming hose 138 to establish a desired pressure output at the jet tube 44 to establish a negative demand pressure within the body 22 of the jet transfer assembly 20 causing water to be drawn through the intake assembly 70, past the check valve assembly 50, into the body 22 of jet transfer assembly 20, and out the output barrel 100 into another portable holding tank 120a. In the illustrated example, the portable holding tank 120a comprises the suction tank from which the fire engine pump vehicle 136 draws water that is sprayed onto a fire, as shown in FIG. 9. To keep 7 up with the pumping ability of the fire engine pump vehicle 136, a singular water jet transfer device 10 is capable of pumping 1250-1500 GPM when built consistent with the various dimensions disclosed herein thereby replacing the need for two currently available jet devices.

F. Operation of Alternative Embodiment

Figure 13:
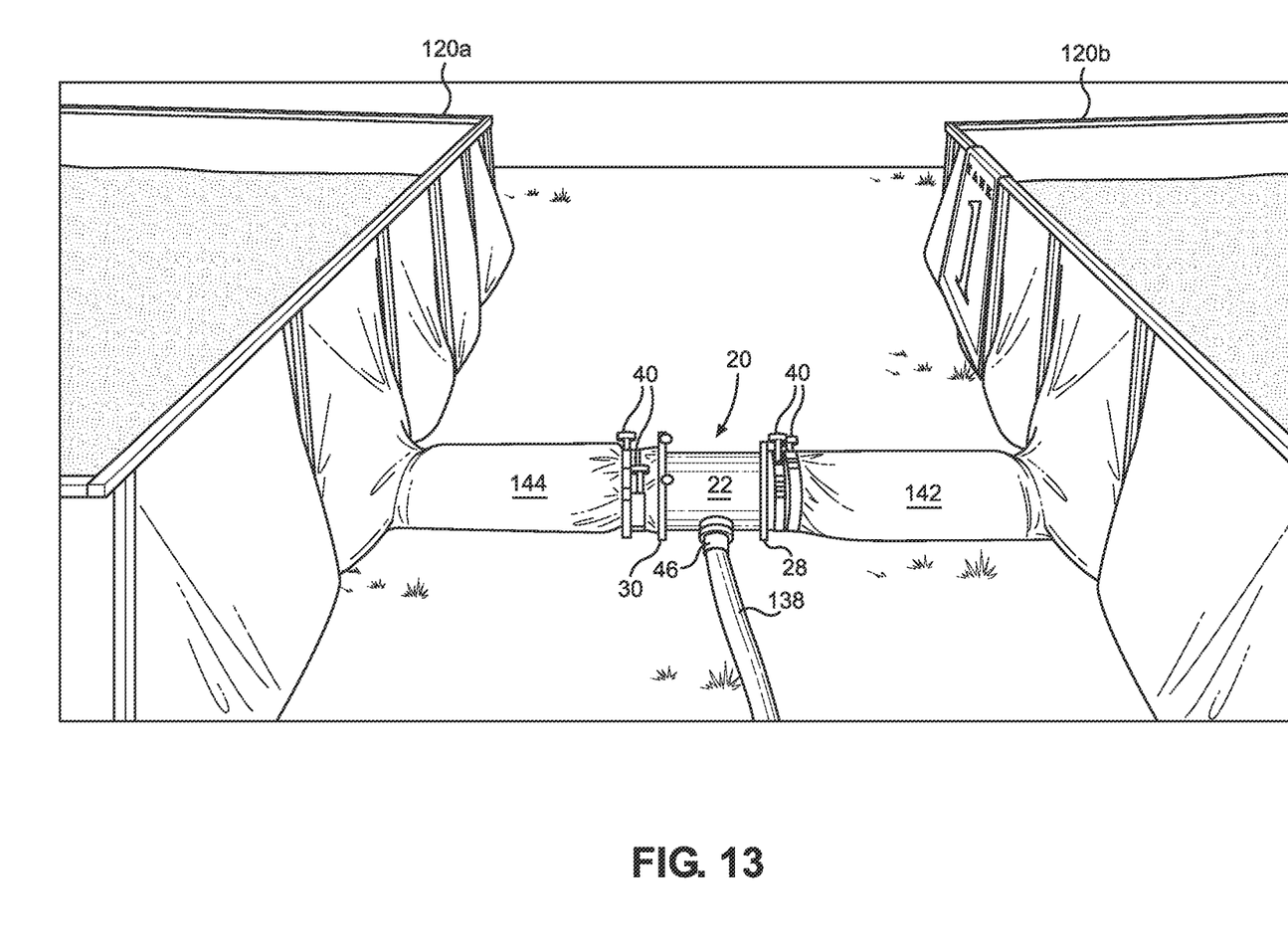
FIG. 13 is a perspective view of an alternative embodiment of the water jet transfer device.

In certain embodiments, the jet transfer assembly 20 is used without the intake assembly 70 and without the output barrel 100. As illustrated in FIG. 13, only the jet transfer assembly 20 is used to couple a first portable holding tank drain sleeve 142 of the first portable holding tank 120b with a second portable holding tank drain sleeve 144 of the second portable holding tank 120a. In operation, the priming hose 138 is used to establish a desired pressure output at the jet tube 44 of the jet transfer assembly 20 to establish a negative demand pressure within the body 22 of the jet transfer assembly 20 causing water to be drawn from the first portable holding tank 120b through the first drain sleeve 142, past the check valve assembly 50, into the body 22 of jet transfer assembly 20, out the second drain sleeve 144, and into the second portable holding tank 120a operating as a suction tank from which the fire engine pump vehicle 136 draws water for spraying on a fire. In this configuration, the check valve assembly 50 enables the water-receiving portable holding tank 120a to be at a substantially full water level and the water-supplying portable holding tank 120b to be at a much lower water level ready to receive additional water from another tanker vehicle 130. This configuration also allows a water pull down of almost 100% of the water in the water-supplying portable holding tank 120b.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as May be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. A water jet transfer device, comprising:
   a jet transfer assembly comprising:
      a body having a water-outlet end coupled to a first section of flexible tubing and a water-intake end coupled to a second section of flexible tubing;
      a jet tube within the body; and
      a check valve assembly proximate the water-intake end, the check valve having a valve support plate and a flexible valve seal member secured to the valve support plate;
   a water-intake assembly coupled to the second section of flexible tubing; and
   an output barrel coupled to the first section of flexible tubing.

2. The water jet transfer device of claim 1, wherein the water-intake assembly supplies water to the jet transfer assembly responsive to the jet tube establishing a negative demand pressure within the body of the jet transfer assembly.

3. The water jet transfer device of claim 1, wherein quick locking lever clamps secure the second section of flexible tubing to the water-intake assembly and secure the first section of flexible tubing to the output barrel.

4. A jet transfer assembly, comprising:
   a body having a water-outlet end coupled to a first section of flexible tubing and a water-intake end coupled to a second section of flexible tubing;
   a jet tube within the body that establishes a negative demand pressure within the body; and
   a check valve assembly proximate the water-intake end of the body, wherein the check valve assembly includes a valve support plate including a plurality of openings and a flexible valve seal member secured to the valve support plate, wherein the flexible valve seal member flexes to expose at least a portion of the plurality of openings of the valve support plate to enable an in-flow of water into the body at the water-intake end responsive to the negative demand pressure and wherein the flexible valve seal member flexes to cover at least a portion of the plurality of openings of the valve support plate to prevent an out-flow of water from the body at the water-intake end.

5. The jet transfer assembly of claim 4, wherein an inner diameter of the body is at least 8 inches.

6. The jet transfer assembly of claim 4, wherein an inner diameter of the jet tube is at least 0.8 inches.

7. The jet transfer assembly of claim 4, wherein the jet tube is of a curved, one-piece configuration.

8. The jet transfer assembly of claim 4, wherein the flexible valve seal member is secured to the valve support plate via a hinge bar secured between the flexible valve seal member and a mounting rib of the valve support plate.

9. The jet transfer assembly of claim 4, wherein hinge bar divides the flexible valve seal member into first and second symmetrical valve flaps.

10. The jet transfer assembly of claim 4, wherein the valve support plate is at least eight inches in diameter.

11. The jet transfer assembly of claim 4, wherein the jet transfer assembly is capable of outputting water at a rate of 1250-1500 gallons per min at the water-outlet end.

12. The jet transfer assembly of claim 4, wherein the second section of flexible tubing is coupled to a water intake assembly.

13. The jet transfer assembly of claim 12, wherein the water intake assembly includes a lower portion defined by an upper plate coupled to a lower plate and an upper portion that includes an intake pipe, wherein the intake pipe is secured to the upper plate.

14. The jet transfer assembly of claim 13, wherein the lower plate includes a plurality of suction openings.

15. The jet transfer assembly of claim 13, wherein the lower plate includes upwardly bent vortices-reducing first and second ends.

16. The jet transfer assembly of claim 13, wherein the lower portion is defined by four sides, each side having a water-drawing opening.

17. The jet transfer assembly of claim 13, wherein a space between the upper plate and the lower plate of the water intake assembly includes a plurality of vortices-reducing dividers.

18. The jet transfer assembly of claim 13, wherein the plurality of vortices-reducing dividers divide the lower portion into at least six zones.

19. The jet transfer assembly of claim 13, wherein the intake pipe is oriented at approximately 30 degrees relative to the upper plate of the water intake assembly.

20. The jet transfer assembly of claim 4, wherein the first section of flexible tubing is coupled to an output barrel.

21. The jet transfer assembly of claim 20, wherein the output barrel includes an elongate neck portion and an output head portion.

22. The jet transfer assembly of claim 21, wherein a diffuser plate is included within the elongate neck portion.

23. The jet transfer assembly of claim 21, wherein the output barrel includes an exterior handle.

24. The jet transfer assembly of claim 21, wherein the output head portion includes one or more strap holders and wherein the jet transfer assembly additionally includes a safety strap that is threaded through the one or more strap holders and is secured to the output head portion.

25. The jet transfer assembly of claim 21, wherein the output head portion includes one or more u-shaped mounting brackets that are mountable atop railing of a portable holding tank and wherein the u-shaped mounting brackets mounted atop the railing position the elongate neck portion at an angle of approximately 30 degrees relative to the railing.

26. The jet transfer assembly of claim 25, wherein the u-shaped mounting brackets are rotatably secured to the output head portion.

27. A jet transfer device, comprising:
a body having a water-outlet end coupled to a first section of flexible tubing and a water-intake end coupled to a second section of flexible tubing;
a jet tube within the body; and
a check valve assembly proximate the water-intake end, the check valve having a valve support plate and a flexible valve seal member secured to the valve support plate,
wherein the jet transfer device is configurable between a first configuration for pumping water from a water holding tank and a second configuration for pumping water from the water holding tank;
wherein the first configuration comprises the jet transfer device positioned intermediate a first drain sleeve of a first water holding tank containing water and a second drain sleeve of a second water holding tank, wherein the second section of flexible tubing is coupled to the first drain sleeve and wherein the first second of flexible tubing is coupled to the second drain sleeve; and
wherein the second configuration comprises the jet transfer device positioned intermediate a water-intake assembly and an output barrel, wherein the second section of flexible tubing is coupled to an intake pipe of the water-intake assembly and a lower portion of the water-intake assembly is below the water in the first water holding tank, and wherein the first section of flexible tubing is coupled to an output barrel having an output head portion mounted atop an upper railing of the first water holding and an opening of the output head portion is directed toward the second water holding tank.

* * * * *